United States Patent
Foster et al.

(10) Patent No.: US 8,452,496 B2
(45) Date of Patent: May 28, 2013

(54) COTTON MODULE TRACKING SYSTEM AND METHOD THAT ELIMINATES COTTON MODULE MARKING

(75) Inventors: Christopher A. Foster, Denver, PA (US); Justin R. Ringwald, Ellinwood, KS (US); Douglas S. Fitzkee, Ephrata, PA (US); Kevin S. Richman, Plainfield, IL (US); Jesse H. Orsborn, Warsaw, MO (US); Thomas H. Brown, Jr., Reinholds, PA (US); John H. Posselius, Ephrata, PA (US)

(73) Assignee: CNH America LLC, New Holland, PA (US)

( * ) Notice: Subject to any disclaimer, the term of this patent is extended or adjusted under 35 U.S.C. 154(b) by 36 days.

(21) Appl. No.: 13/170,461

(22) Filed: Jun. 28, 2011

(65) Prior Publication Data

US 2013/0006481 A1  Jan. 3, 2013

(51) Int. Cl.
*G06F 19/00* (2011.01)
(52) U.S. Cl.
USPC .......................................................... 701/50
(58) Field of Classification Search
USPC .............. 342/147; 56/28; 340/5.92; 700/215, 700/225, 226, 229
See application file for complete search history.

(56) References Cited

U.S. PATENT DOCUMENTS

| | | | |
|---|---|---|---|
| 5,845,229 A | 12/1998 | Rawlings | |
| 6,563,417 B1 | 5/2003 | Shaw | |
| 6,614,392 B2 | 9/2003 | Howard | |
| 6,691,135 B2 | 2/2004 | Pickett et al. | |
| 7,034,683 B2 | 4/2006 | Ghazarian | |
| 7,082,740 B2 | 8/2006 | van der Lely | |
| 7,085,777 B2 | 8/2006 | Beck et al. | |
| 7,250,858 B2 | 7/2007 | Schmidtberg et al. | |
| 7,313,549 B2 | 12/2007 | Hudson | |
| 7,336,181 B2 | 2/2008 | Nowak et al. | |
| 7,394,372 B2 | 7/2008 | Gloekler et al. | |
| 7,397,358 B2 | 7/2008 | Boothroyd | |
| 7,415,924 B2 | 8/2008 | Roberts | |
| 7,434,375 B2 | 10/2008 | Pickett et al. | |
| 2003/0182144 A1* | 9/2003 | Pickett et al. | 705/1 |
| 2005/0107934 A1 | 5/2005 | Gudat et al. | |
| 2005/0234641 A1* | 10/2005 | Marks et al. | 701/213 |
| 2007/0181469 A1 | 8/2007 | Stover | |
| 2008/0052876 A1 | 3/2008 | Stover | |
| 2008/0117023 A1 | 5/2008 | Wilcox et al. | |
| 2008/0143482 A1 | 6/2008 | Shoarinejad et al. | |
| 2008/0252459 A1 | 10/2008 | Butler et al. | |
| 2009/0107349 A1* | 4/2009 | Noonan et al. | 100/14 |

* cited by examiner

*Primary Examiner* — Mary Cheung
*Assistant Examiner* — Jerrah Edwards
(74) *Attorney, Agent, or Firm* — Rebecca Henkel; Patrick Sheldrake

(57) ABSTRACT

A system and method for automatically identifying, locating, and tracking a cotton module that eliminates the necessity of physically marking or tagging the cotton module, such system and method using information such a location of the cotton module and a heading of a harvesting vehicle and a transport vehicle.

20 Claims, 14 Drawing Sheets

RECORD
COTTON MODULE IDENTIFIER

PLANTING, GROWING & HARVESTING INFORMATION

SEED TYPE   YIELD DATA AT TIME OF HARVEST   MOISTURE CONTENT
TIMING AND QUANTITY OF ONE OR MORE CHEMICALS OR FERTILIZERS
AREA OF THE FIELD FROM WHICH COTTON MODULE WAS HARVESTED

TRACKING AND POSSESSION HISTORY

| HARVESTING VEHICLE ID | OPERATOR ID | UNLOADING LOCATION | VEHICLE HEADING | UNLOADING TIME & DATE | COMMENTS |
|---|---|---|---|---|---|
| TRANSPORT VEHICLE ID | OPERATOR ID | LOADING LOCATION | VEHICLE HEADING | LOADING TIME & DATE | COMMENTS |
| TRANSPORT VEHICLE ID | OPERATOR ID | UNLOADING LOCATION | VEHICLE HEADING | UNLOADING TIME & DATE | COMMENTS |

•
•
•

| TRANSPORT VEHICLE ID | OPERATOR ID | LOADING LOCATION | VEHICLE HEADING | LOADING TIME & DATE | COMMENTS |
|---|---|---|---|---|---|
| TRANSPORT VEHICLE ID | OPERATOR ID | UNLOADING LOCATION | VEHICLE HEADING | UNLOADING TIME & DATE | COMMENTS |

PROCESSING AND CLASSIFICATION INFORMATION

PROCESSING FACILITY   YIELD DATA AT THE PROCESSING FACILITY
SEED COTTON WEIGHT   LINT WEIGHT        COTTON GRADE
COTTON COLOR         UNIFORMITY         TRASH CONTENT
COTTON FIBER DIAMETER                   COTTON FIBER STRENGTH

FIG. 9

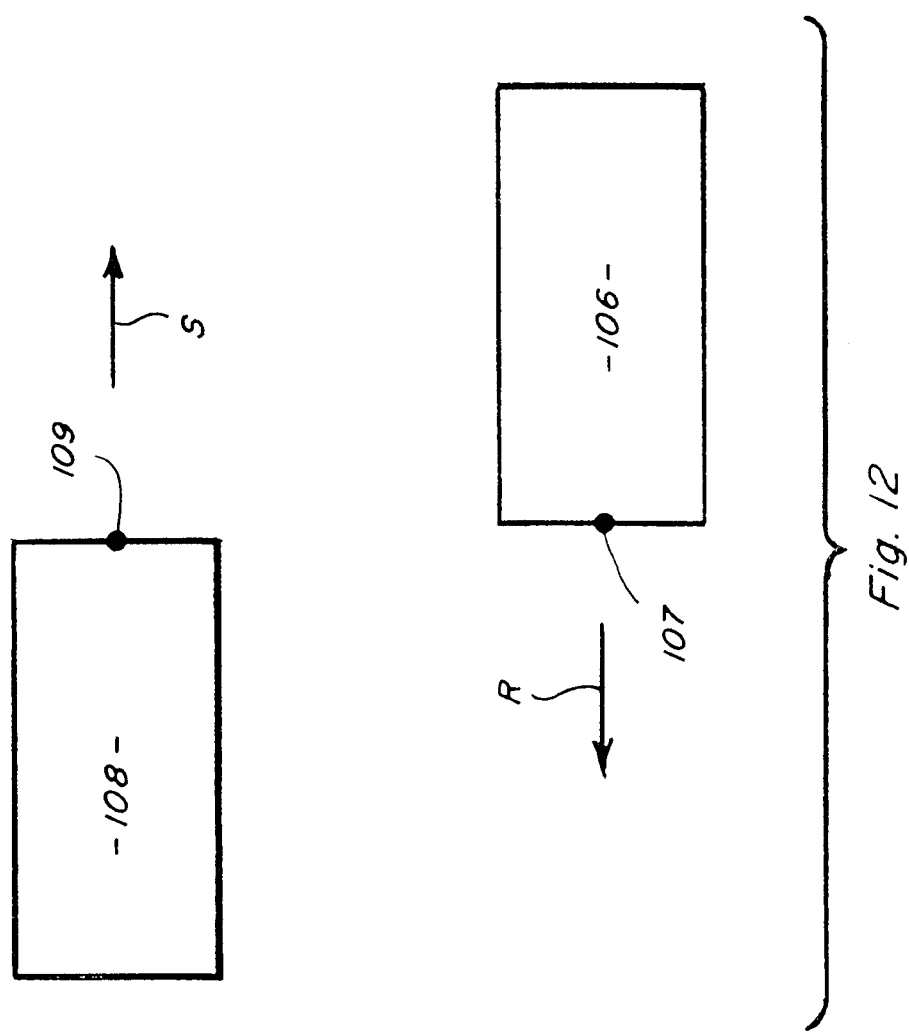

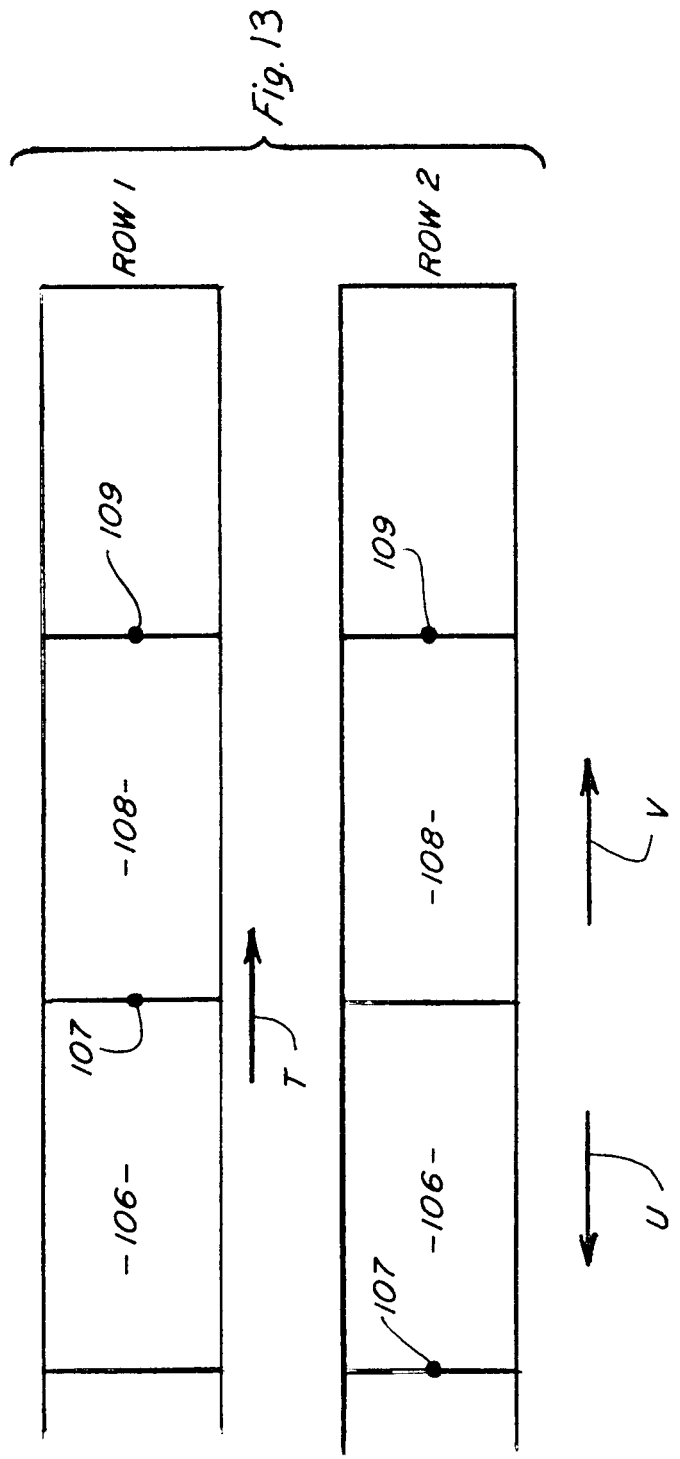

COTTON MODULE TRACKING SYSTEM AND METHOD THAT ELIMINATES COTTON MODULE MARKING

TECHNICAL FIELD

This invention relates generally to tracking a cotton module after harvesting, and more specifically to a system and method for automatically identifying, locating, and tracking a cotton module that eliminates the necessity of physically marking or tagging the cotton module, such system and method using information such as a location of the cotton module and a heading of a harvesting vehicle and a transport vehicle.

BACKGROUND ART

Cotton harvesters including on-board cotton module builders are typically used to create cotton modules having a generally rectangular shape, conforming to specific dimensions to facilitate handling and transporting on dedicated transport vehicles and processing by gins. The most accepted and recognized of the known on-board cotton module builders utilize an accompanying unloading door or ramp, which unfolds as the cotton module builder is tilted, for providing a continuous, level surface extending from the floor of the builder to the ground or other surface onto which the cotton module is to be unloaded. The cotton module is moved along the ramp by a suitable driver system which may include one or more independently controllable powered drag chains, belts, rollers, or the like. Typically the unloading ramp is used in conjunction with a sensing system that identifies the position of the cotton module along the ramp as it is unloading.

Usually cotton modules are unloaded by the harvester in or near the swath of field from which the cotton was harvested. At a later time a transport vehicle collects the cotton modules and transports them from their various locations in the field and unloads them in a common location to await transport to a cotton gin for further processing. It is not uncommon for a cotton module to be transported several times prior to reaching the gin.

To improve crop yield and quality, it is desirable to be able to record, correlate, and analyze information associated with a crop at various phases of production, such as planting, growing, harvesting, transporting, processing, or classifying. A farmer can analyze the collected information and use it in the decision making process through the current season and future seasons. Planting, growing, and harvesting information of interest may include seed type, seed quantity, timing and quantity of chemicals and fertilizer applied to the crop, time of harvest, yield data at time of harvest, moisture content, area of the field from which the crop is harvested, and the like. Processing and classifying information of interest may include identification of the processing facility, processing start time, processing end time, yield data at the processing facility, seed cotton weight, lint weight, grade, color, fiber diameter, fiber strength, uniformity, trash content, storage location, and the like.

It is also desirable to record, correlate, and analyze information associated with transporting the cotton modules. This information can be used to create a possession history, and may be helpful in determining the effectiveness of equipment, efficiency and timeliness of vehicle, operators, and the like. The possession history may also provide information for determining ownership and/or liability for damage that may occur to the cotton module during transport from field to processing facility. Transporting information of interest may include identification of the harvesting vehicle, identification of the transport vehicle(s), identification of an operator, time of unloading from the harvester, time of loading on the transport vehicle, time of unloading from the transport vehicle, and the like.

To facilitate the collection of information for analysis, the cotton modules are typically marked with an identifier. A dedicated crew will write the identifier directly on the cotton module or on a tag that is manually attached to the cotton module or a cotton module cover. During harvesting, one crew may be responsible for marking cotton modules from several harvesters working in the field.

This system is labor intensive and prone to human error. Even using ground positioning system (GPS) coordinates to locate the cotton modules can result in uncertainty when cotton modules are relatively close to one another due to variations or error margins between various GPS systems. Also, if an unmarked cotton module is moved prior to marking, it will be even more difficult to determine its new location. If cotton modules are identified in error, the record of information associated with these cotton modules will be in error and any future decisions made will be based on incorrect information.

Accordingly, what is sought is a system and method for automatically identifying, locating, and tracking a cotton module that eliminates the necessity of physically marking or tagging the cotton module, which overcomes at least one of the problems, shortcomings or disadvantages as set forth above.

SUMMARY OF THE INVENTION

What is disclosed is a system and method for automatically identifying, locating, and tracking a cotton module that eliminates the necessity of physically marking or tagging the cotton module, which overcomes at least one of the problems, shortcomings or disadvantages as set forth above.

According to the present invention, a cotton module of harvested cotton is identified, located, and tracked from initial unloading in the field from a harvesting vehicle through transport by at least one transport vehicle to a processing facility and beyond. Advantageously, the necessity of physically marking the cotton module is unnecessary, thus eliminating a source of error and reducing labor requirements.

A preferred embodiment of the system of the invention includes a location system configured and operable to automatically determine information representative of a heading of the harvesting vehicle, a heading of the transport vehicle, and a location of the cotton module each time the cotton module is unloaded therefrom and loaded onto. The system further includes a communication network apparatus having at least one processor programmed to communicate with the harvesting vehicle, the at least one transport vehicle, the location system, and a user through a user interface. The processor is programmed to automatically assign an identifier to the cotton module when unloaded from the harvesting vehicle, develop a record of information related to the cotton module including at least the identifier and the information from the location system, augment the record with the information from the location system each time the cotton module is unloaded and loaded, store the record in a database, and output the information. By accessing the information developed in the record, the user can identify, locate, and track the unmarked cotton module as a function of the information representative of locations of the cotton module and the headings of the vehicles from which the cotton module was unloaded.

According to a preferred feature of the invention, the location system includes a ground positioning system (GPS), and the location of the cotton module is defined in GPS coordinates. In addition, the heading of the vehicle may be determined from differential GPS readings in a well known manner.

According to another preferred feature of the invention, the location of the cotton module is a location of a predetermined reference point of the cotton module, and the predetermined reference point is a function of the heading of the vehicle from which the cotton module is unloaded.

Preferably, the record includes at least the identifier and the information from the location system. According to a preferred aspect of the invention, the record further includes a tracking history of the cotton module developed as a function of successive entries of the information representative of the location of the cotton module and the heading of the vehicle which the cotton module is unloaded from or loaded on for each time the cotton module is unloaded and loaded, respectively.

According to another preferred aspect of the invention the record further includes information associated with the cotton module including at least some of: seed type, timing and quantity of one or more chemicals or fertilizers applied, time of harvest, yield data at time of harvest, moisture content, and harvesting location.

According to yet another preferred aspect of the invention, the record further includes information associated with processing and classifying the cotton module and cotton processed therefrom including at least some of: identification of a processing facility, yield data at the processing facility, seed cotton weight, lint weight, cotton grade, cotton color, cotton fiber diameter, cotton fiber strength, uniformity, trash content, and the like.

According to yet another preferred aspect of the invention, the record further includes information representative of identification of the transport vehicle, time of loading the cotton module, and time of unloading the cotton module for each time the cotton module is loaded and unloaded.

According to yet another preferred aspect of the invention, the record further includes information representative of a time and a date for each time the cotton module is loaded on a transport vehicle.

According to yet another preferred aspect of the invention, the record further includes a tracking and possession history of the cotton module developed by associating information representative of identification of the vehicle from which the cotton module is unloaded and time of unloading with information from the location system for each time the cotton module is unloaded and information representative of identification of the vehicle on which the cotton module is loaded and time of loading with information from the location system for each time the cotton module is loaded, respectively.

According to yet another preferred aspect of the invention, the user may augment the record with comments or observations prior to loading or after unloading the cotton module.

The present invention eliminates the labor intensive necessity of marking or tagging each cotton module and eliminates the risk of error associated therewith. In addition, if unmarked cotton modules from different areas of the field, or from different fields, are transported and unloaded in another location, a desired cotton module can be identified with more certainty because the cotton module is tracked and located as a function of the record of the location of the cotton module and the heading of the vehicle which the cotton module was unloaded from or loaded on. Another feature of the invention includes the availability of possession tracking of the cotton module. By monitoring the possession of the cotton module, loss or damage to cotton modules may be assigned more equitably, and performance of equipment and operators may be more tangibly assessed.

BRIEF DESCRIPTION OF THE DRAWINGS

FIG. 9 is an exemplary record that may be developed according to the invention;

FIG. 12 is an enlarged portion of the field illustrating one of the advantages of the present invention; and FIG. 13 is an enlarged portion of a top view of a row of cotton modules for illustrating the advantages of the present invention.

DETAILED DESCRIPTION OF THE INVENTION

Figure 1:
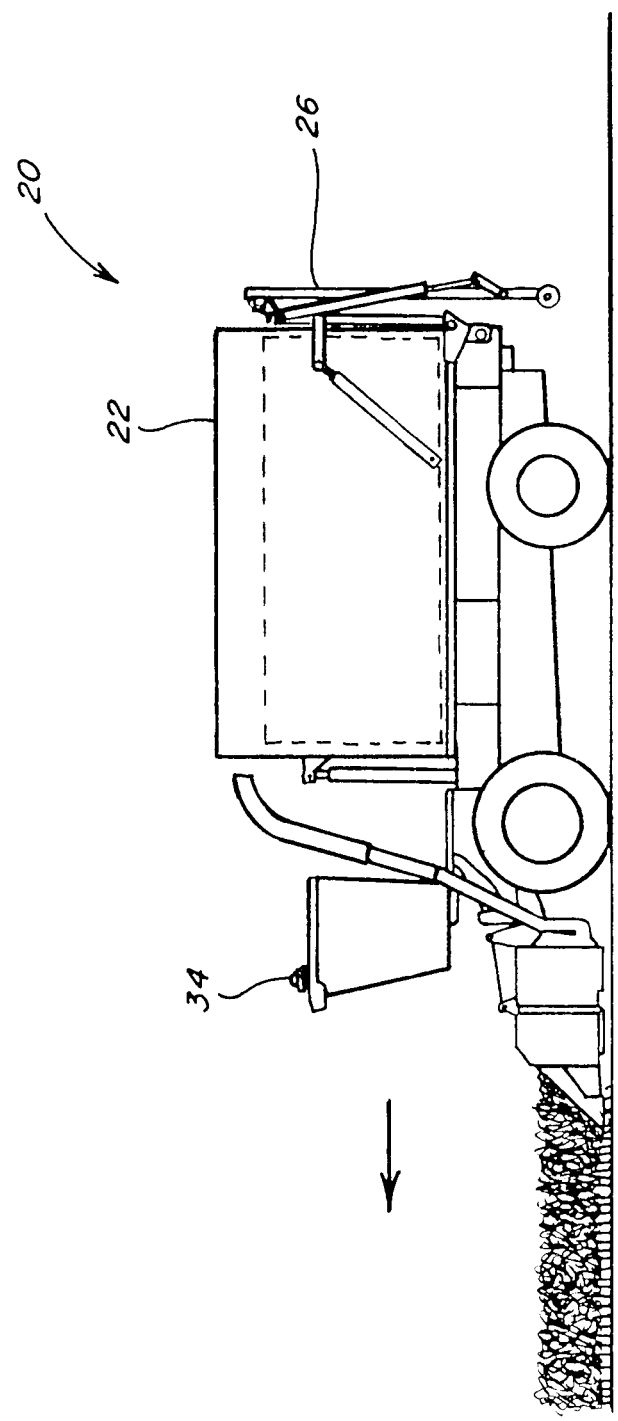
FIG. 1 is a simplified side view of a representative cotton harvesting vehicle having an on-board cotton module builder including a foldable unloading door arrangement in a harvesting position.
Figure 2:
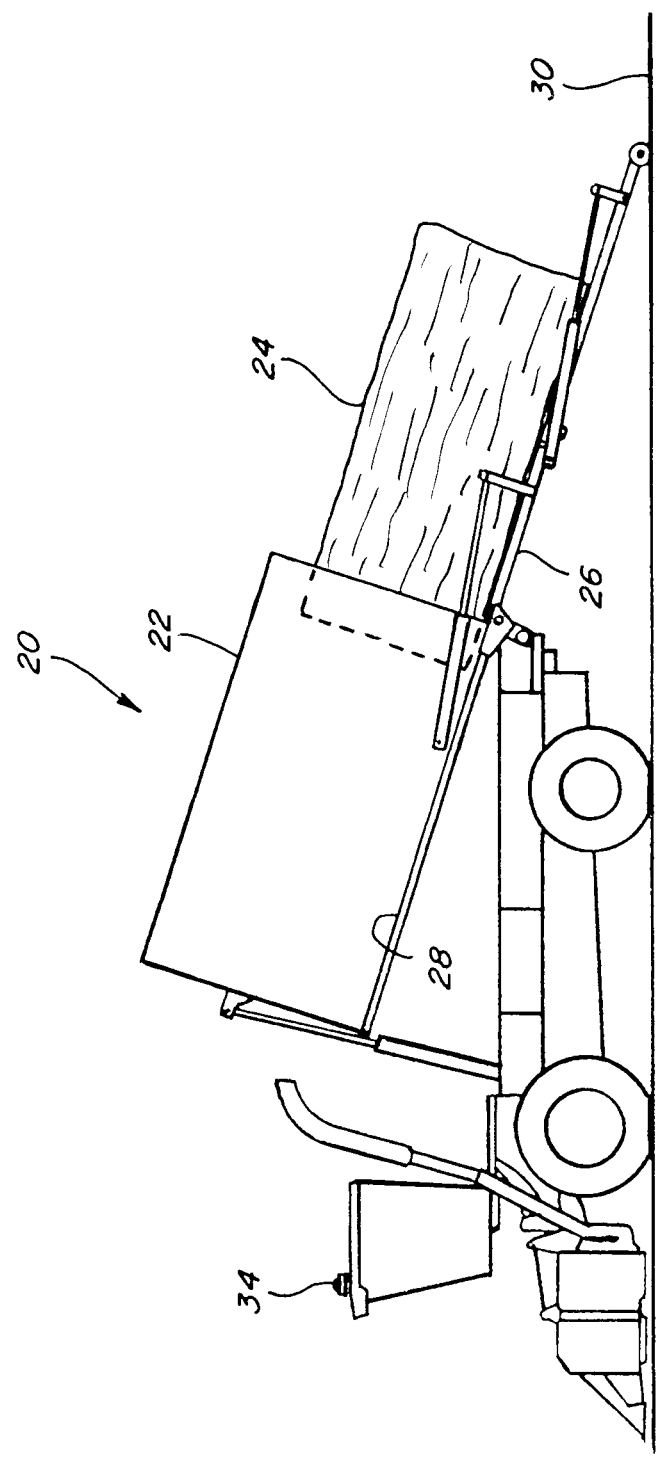
FIG. 2 is another simplified side view of the harvesting vehicle with the cotton module builder tilted and the unloading door unfolded to an unloading position.
Figure 3:
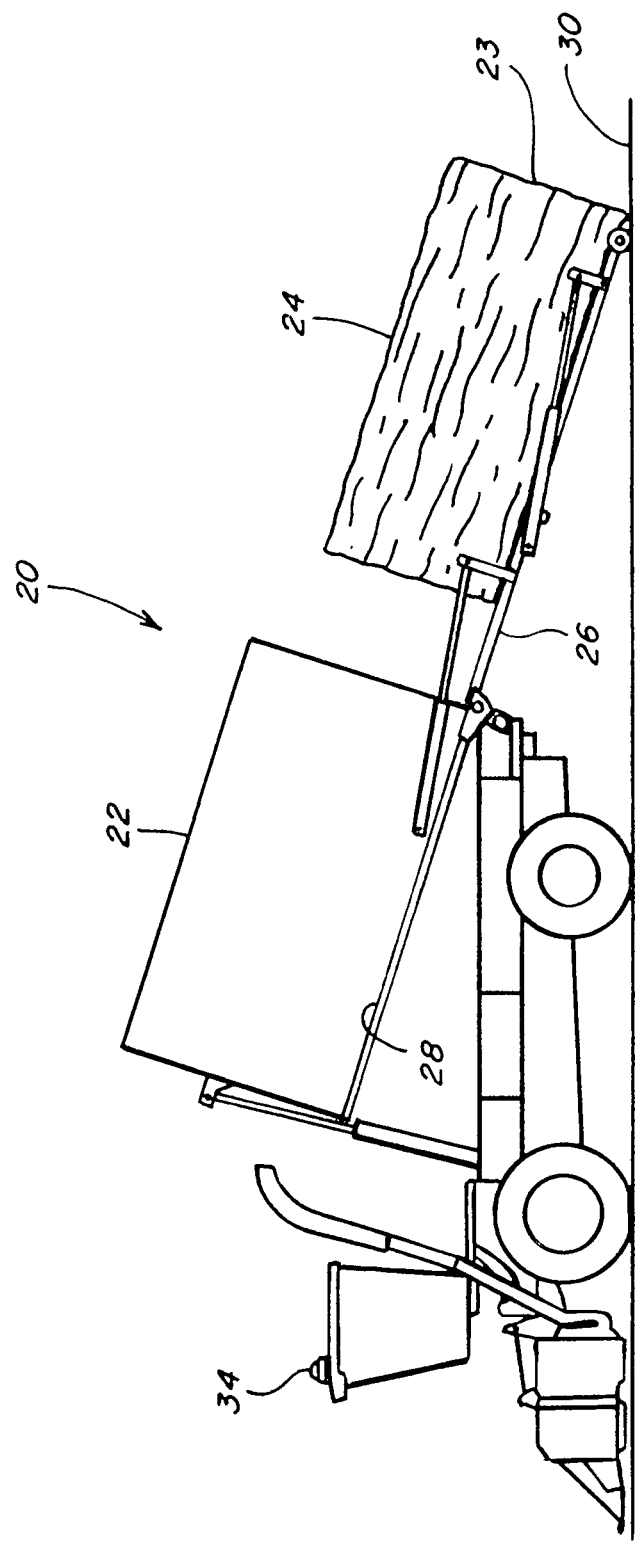
FIG. 3 is yet another simplified side view of the harvesting vehicle with the cotton module builder tilted and the unloading door unfolded to an unloading position.
Figure 4:
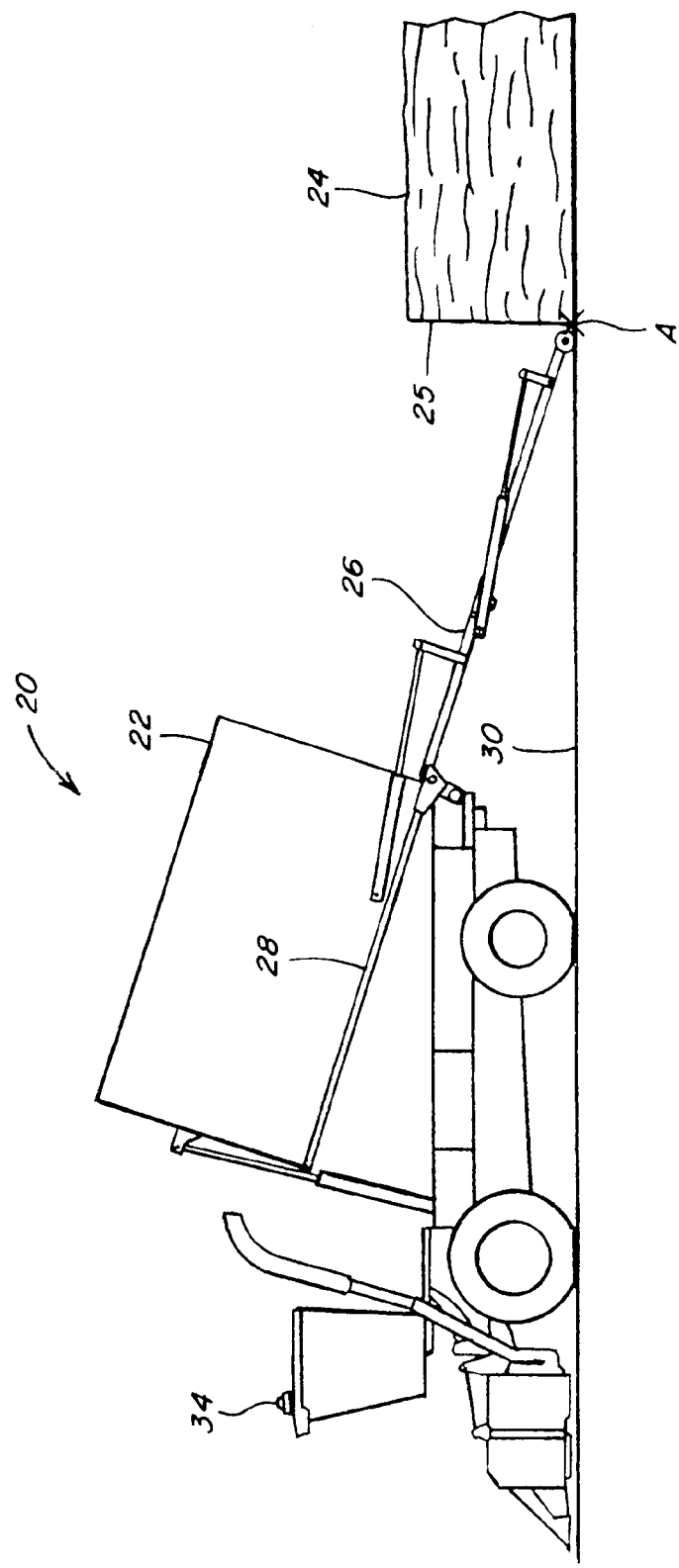
FIG. 4 is yet another simplified side view of the harvesting vehicle with the cotton module builder tilted and the unloading door unfolded to an unloading position.
Figure 5:
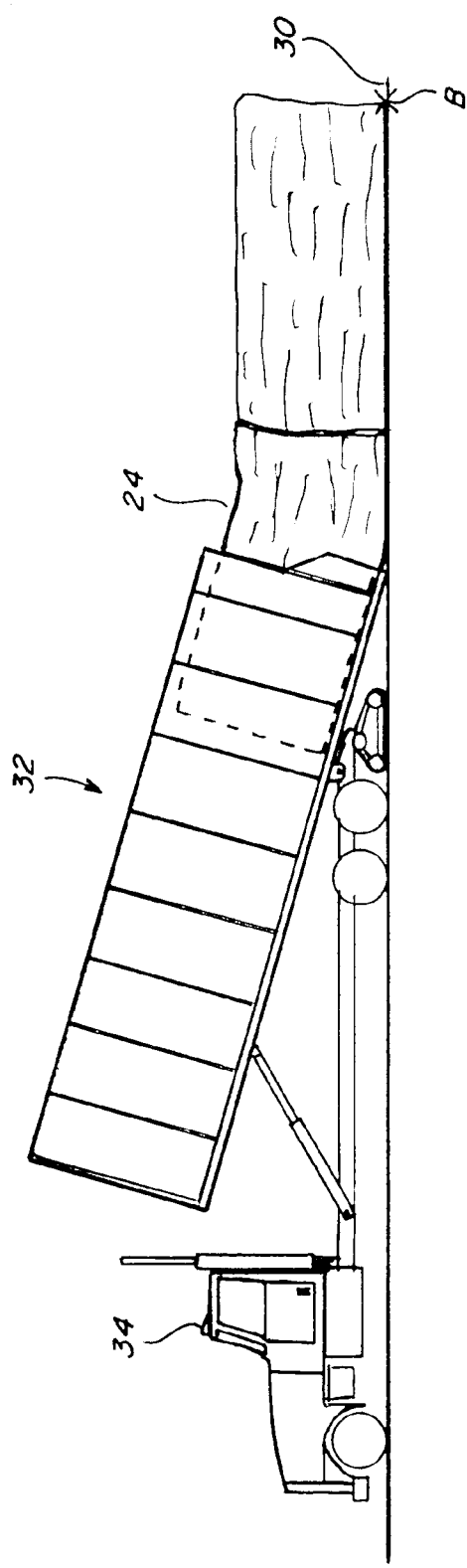
FIG. 5 is a simplified side view of a cotton module transport vehicle in the loading/unloading position.

Turning now to the drawings, wherein FIGS. 1 through 4 depict a representative cotton harvesting vehicle 20 including an on-board cotton module builder 22 of well-known construction and operation. An unloading door or ramp 26 unfolds as cotton module builder 22 is tilted to provide a continuous level surface from a floor 28 of cotton module builder 22 to a surface 30 onto which a cotton module 24 is to be unloaded. Cotton module 24 is moved along ramp 26 by a suitable driver system (not shown) which may include one or more independently controllable powered drag chains, belts, rollers, or the like. FIG. 5 depicts a representative cotton module transport vehicle 32, also of well-known construction and operation, suitable for collecting and transporting cotton module 24. Harvesting vehicle 20 and transport vehicle 32 include a system for determining the position or progress of cotton module 24 during loading and unloading. For example changes in the force exerted on one or more drag chains of the driver may be monitored to determine the location of cotton module 24 along unloading ramp 26. After unloading, the system provides a location for the cotton module and assists in positioning transport vehicle 32 for loading cotton module 24 from a known location. Such systems are well known and may provide information to determine when a first end 23 of cotton module 24 is unloaded, when a last end 25 of cotton module 24 is unloaded, or both.

Figure 6:
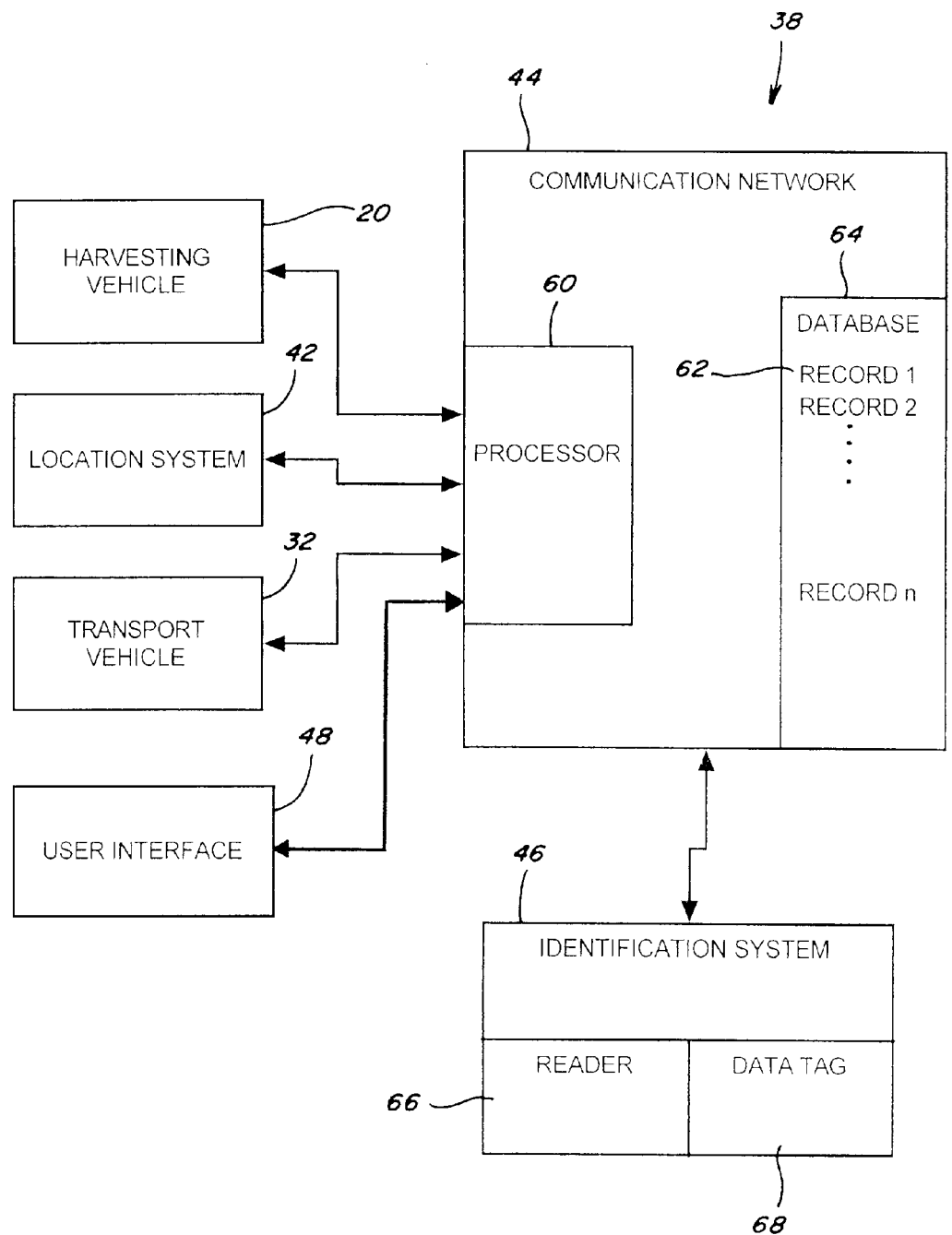
FIG. 6 is a simplified schematic representation of a preferred embodiment of the system of the present invention.

According to the present invention, cotton module 24 of harvested cotton is identified, located, and tracked from initial unloading in the field from harvesting vehicle 20 through transport by at least one transport vehicle 32 to a processing facility (not shown) and beyond. Advantageously, physically marking cotton module 24 is unnecessary, thus eliminating a source of error and reducing labor requirements. A system 38 and a method 40 of the present invention are illustrated schematically and diagrammatically in FIGS. 6 and 7-8, respectively. According to a preferred embodiment of the invention system 38 includes a location system 42 and a communication network apparatus 44.

Figure 7A:
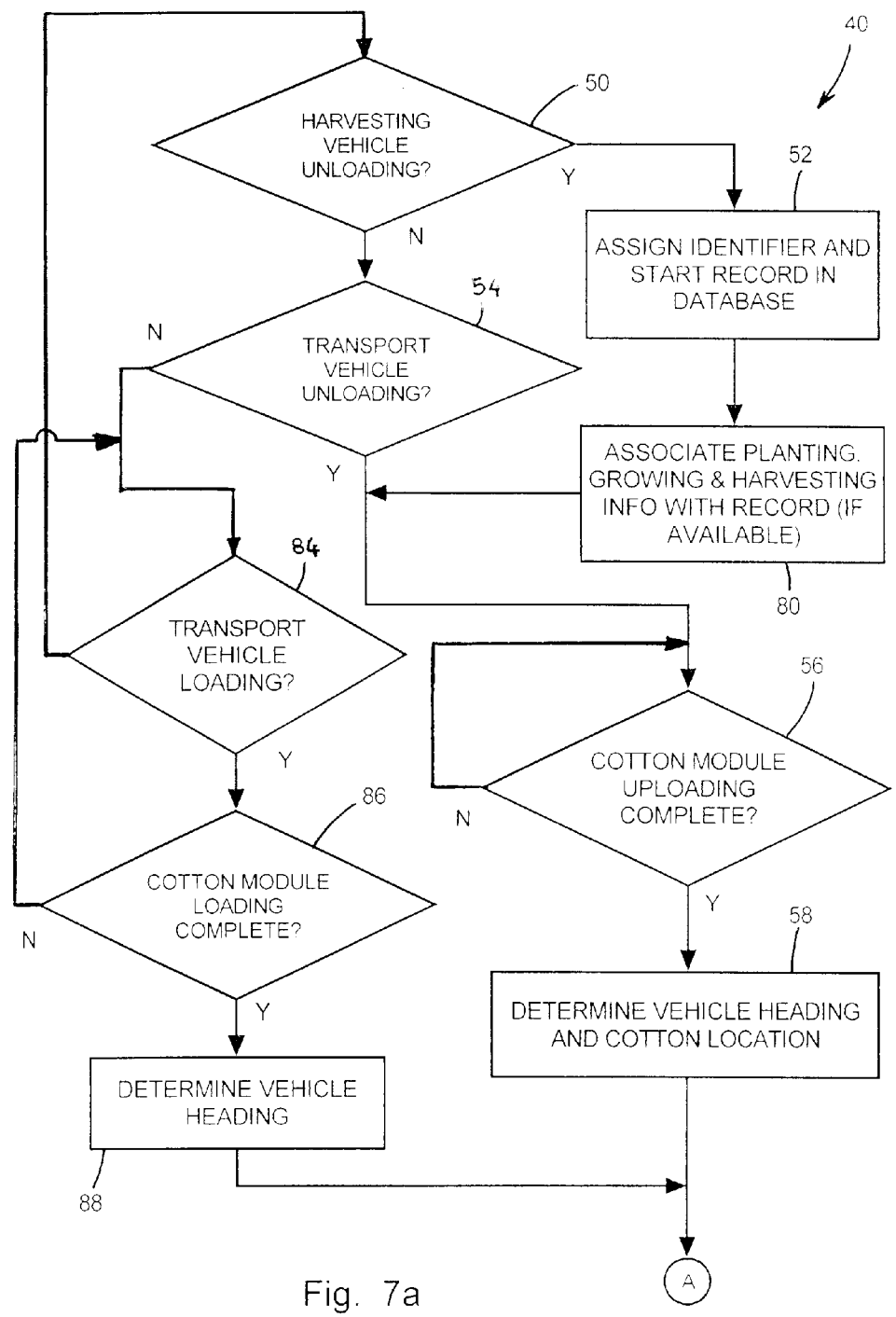
FIG. 7 is a simplified flow diagram of a preferred embodiment according to the present invention.
Figure 7B:
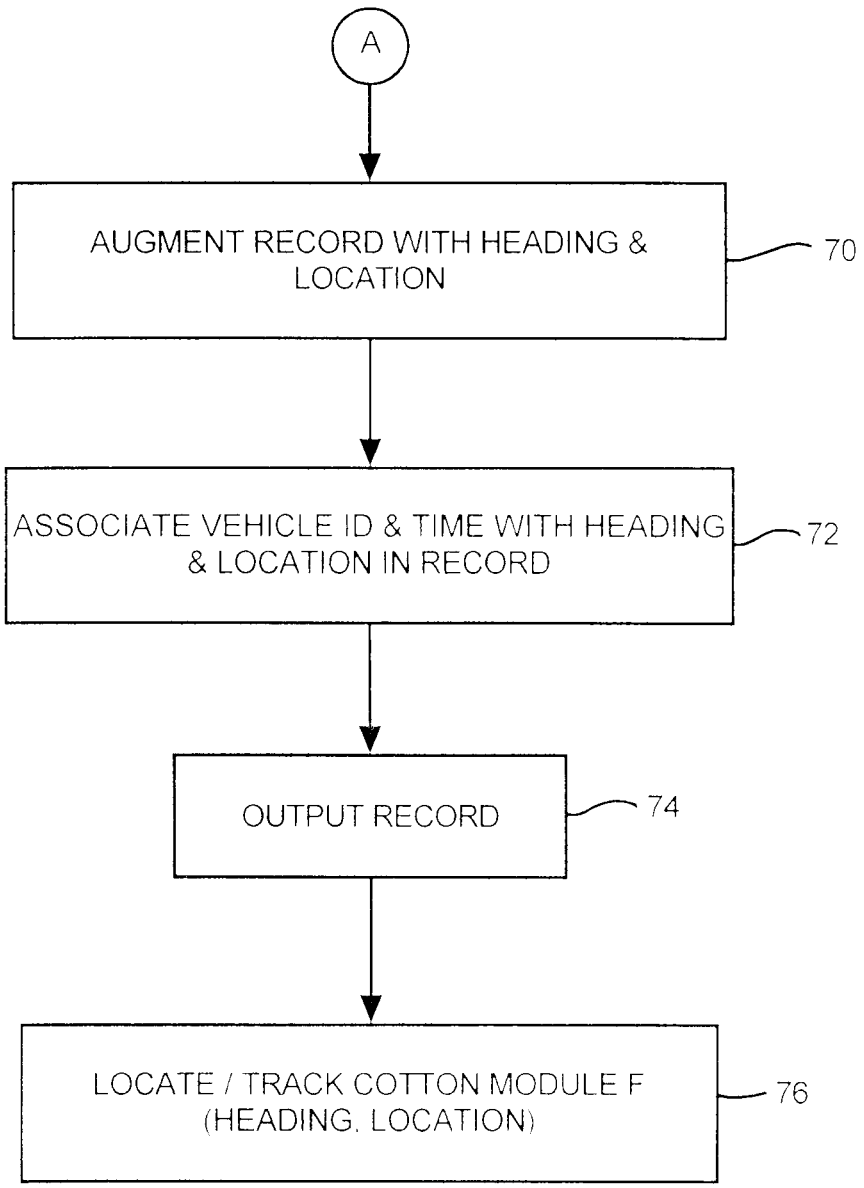

Location system 42 is preferably configured and operable to automatically determine information representative of a heading of harvesting vehicle 20 and transport vehicle 32 and a location of cotton module 24 each time cotton module 24 is unloaded therefrom and loaded onto, respectively. With reference to FIG. 7, the flow diagram for method 40 includes determining vehicle heading and cotton module location at block 58 after confirming that cotton module 24 has been unloaded at decision block 56 by either transport vehicle 32 or harvesting vehicle 20 at decision blocks 54 and 50, respectively. When loading cotton module 24, location system 42 identifies the cotton module to be loaded using the location of the cotton module and the heading of the previous unloading vehicle. Once loaded, location system 42 determines information representative of the heading of the transport vehicle as seen at blocks 84, 86, and 88 of FIG. 7.

According to a preferred feature of the invention, location system 42 includes a ground positioning system (GPS) depicted by GPS antenna 34 in FIGS. 1 through 5, and the cotton module location is defined in GPS coordinates. In addition, the heading of harvesting vehicle 20 and transport vehicle 32 may be determined from differential GPS readings in a well known manner.

According to another preferred feature of the invention, the location of cotton module 24 refers to a location of a predetermined reference point of cotton module 24, and the predetermined reference point is a function of the heading of the vehicle from which cotton module 24 is unloaded. For example, a non-limiting representative reference point, denoted A, is shown at last end 25 unloaded, driver's side corner in FIG. 4. As another example, FIG. 5 shows a reference point, denoted B, at first end 23 unloaded, driver's side corner. The predetermined reference point need not be at a corner of cotton module 24. Other non-limiting possibilities (not shown) include a center of cotton module 24 or a center point on either end of cotton module 24.

Communication network apparatus 44 preferably includes at least one processor 60 programmed to communicate with harvesting vehicle 20, the at least one transport vehicle 32, location system 42, and a user through a user interface 48. Processor 60 is further programmed to automatically assign an identifier to cotton module 24 when unloaded from harvesting vehicle 20 and develop a record 62 of information related to cotton module 24 as shown at blocks 52 and 70, store record 62 in a database 64, and output the information in record 62 as shown at block 74. Database 64 of FIG. 6 includes RECORD 1, RECORD 2 . . . . RECORD n which refer to records created and developed for previously or subsequently unloaded, loaded, or transported cotton modules. Record 62 preferably includes at least the identifier and the information from the location system.

A non-limiting representative example of record 62 according to the present invention is depicted in FIG. 9.

According to a preferred aspect of the invention, record 62 may further include a tracking history of cotton module 24 developed as a function of successive entries of information representative of the location of cotton module 24 and the heading of the vehicle from which cotton module 24 is unloaded and information representative of the location of cotton module 24 and the heading of the vehicle on which cotton module 24 is loaded for each time cotton module 24 is unloaded and loaded, respectively. Such information is determined at blocks 58 and 88, respectively, and added to record 62 at block 70.

According to another preferred aspect of the invention, record 62 may further include information associated with cotton module 24 during planting, growing, and harvesting. Such information may be entered at user interface 48 or transferred to communication network apparatus 44 in another manner prior to or during harvesting and associated with record 62 of cotton module 24 after the identifier is assigned as shown at block 80. Information of interest may include least some of: seed type, timing and quantity of one or more chemicals or fertilizers, yield data at time of harvest, moisture content, area of the field from which the cotton module was harvested, and the like.

Figure 8:
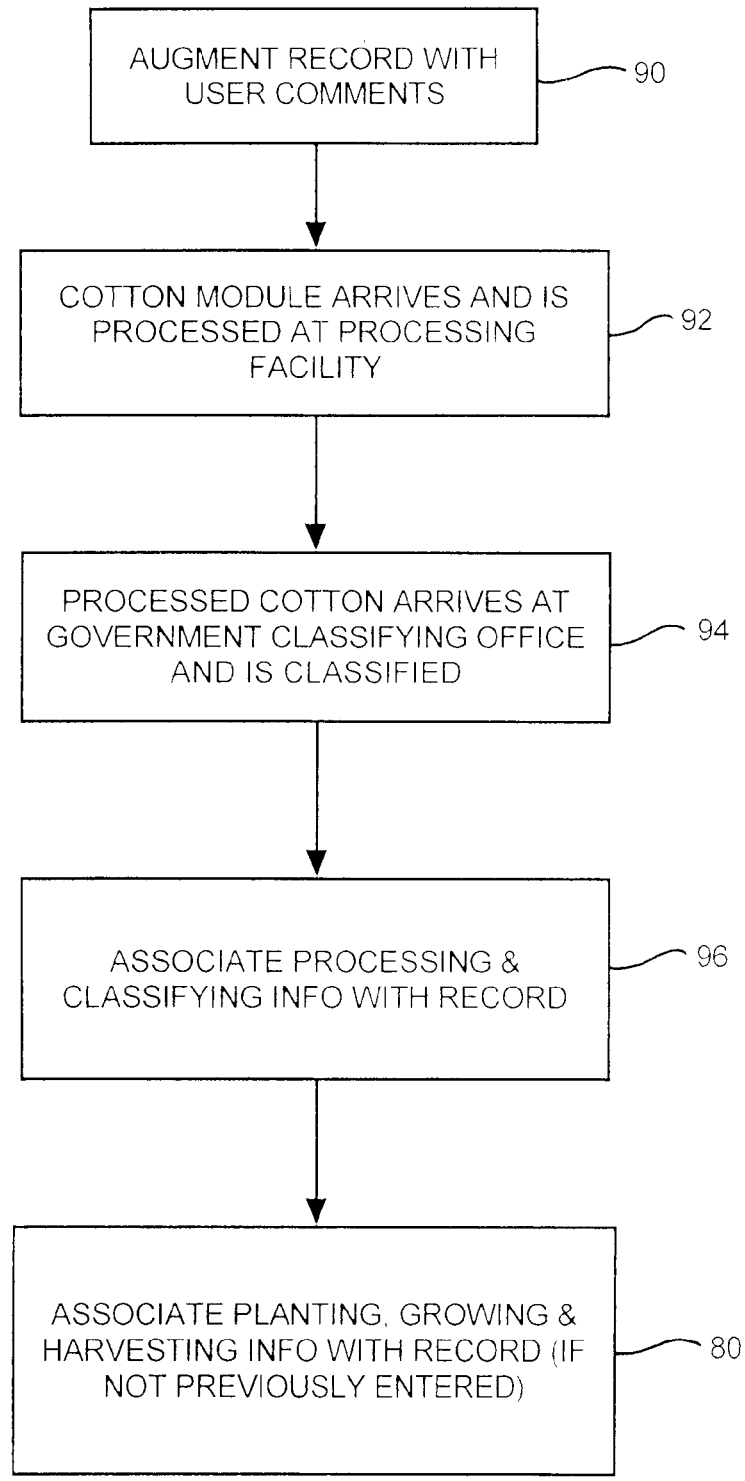
FIG. 8 is a continuation of the simplified flow diagram of FIG. 7.

According to yet another preferred aspect of the invention, record 62 further includes information associated with processing and classifying cotton module 24 and cotton processed therefrom. Again this information may be entered at user interface 48 or transferred to communication network apparatus 44 in another manner. Turning to FIG. 8, this information is associated with record 62 at block 96 after cotton module 24 is processed, and the processed cotton is classified as shown at blocks 92 and 94, respectively. Information of interest may include least some of: identification of a processing facility, yield data at the processing facility, seed cotton weight, lint weight, cotton grade, cotton color, cotton fiber diameter, cotton fiber strength, uniformity, trash content, and the like.

According to yet another preferred aspect of the invention, record 62 further includes information representative of identification of harvesting vehicle 20, identification of transport vehicle(s) 32, time of loading cotton module 24, and time of unloading cotton module 24 for each time cotton module 24 is loaded and unloaded as shown in block 72 of FIG. 7. In the context of this invention, identification of the vehicle may encompass both identification of the vehicle and an operator of the vehicle as seen in FIG. 9. Also with reference to FIG. 9, unloading and loading time includes time and/or date.

According to yet another preferred aspect of the invention, record 62 further includes a tracking and possession history of cotton module 24 developed by associating information representative of identification of the vehicle from which cotton module 24 is unloaded and time of unloading with information from location system 42 for each time the cotton module is unloaded and information representative of identification of the vehicle on which cotton module 24 is loaded and time of loading with information from location system 42 for each time the cotton module is loaded, respectively. Again, in the context of this invention, identification of the vehicle may encompass both identification of the vehicle and the operator of the vehicle, and reference to time may include time and/or date.

According to yet another preferred aspect of the invention, the user may augment record 62 with comments or observations made while handling cotton module 24 as seen at block 90 of FIG. 8. These observations may include damage to cotton module 24, loss of the cotton module cover, existence of harsh weather conditions, and the like.

Figure 10:
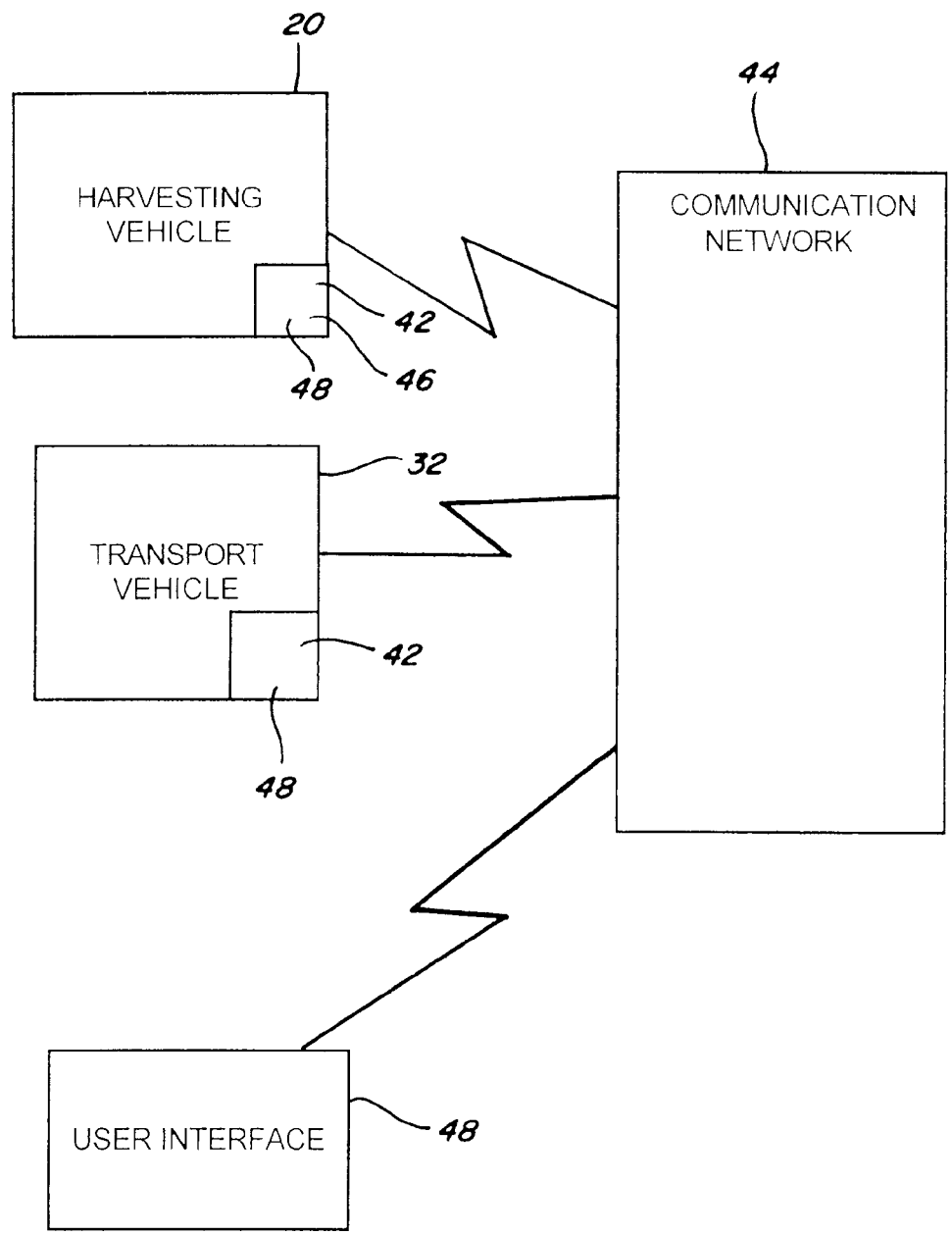
FIG. 10 is another simplified schematic representation of a preferred aspect of the invention.

FIG. 10 illustrates another preferred embodiment of the invention in which the computational activities of system 38 have been redistributed. For example, an on-board computer of harvesting vehicle 20 or transport vehicle 32 may include user interfaces 48 and may act as location system 42 by processing GPS signals and determining the vehicle heading and location of cotton module 24. It is also contemplated that these systems will have the capability to communicate wirelessly.

Figure 11:
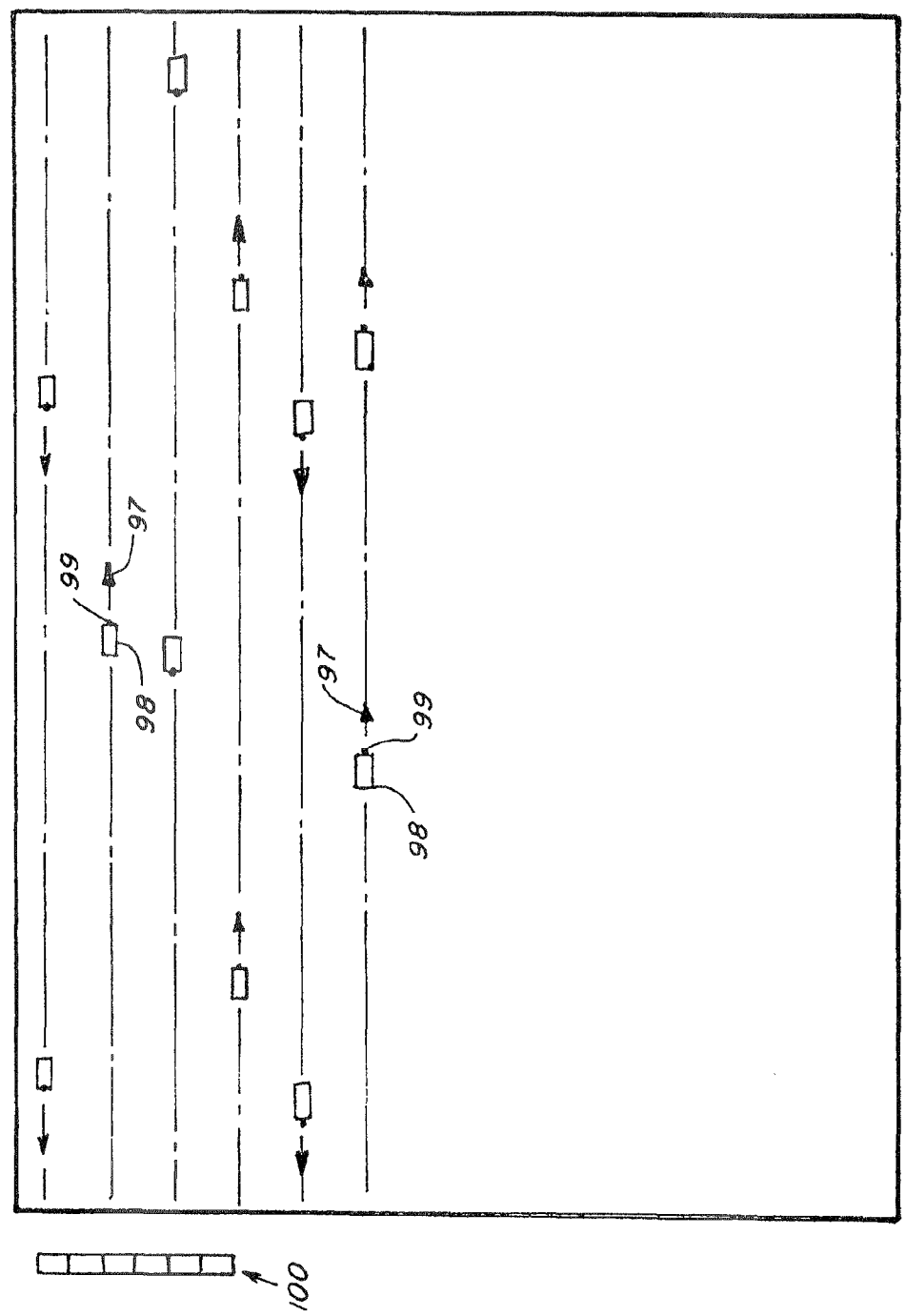
FIG. 11 is a top view of a portion of a cotton field including a row of cotton modules and unloaded cotton modules in the field.

FIGS. 11 through 13 are useful for illustrating some of the advantages of the present invention. FIG. 11 is a top view of a portion of a harvested field. Cotton modules 98 have been unloaded from one or more harvesting vehicles, and a row of cotton modules 100, transported by one or more transport vehicles, is shown at a headland of the field. The heading of the harvesting vehicle associated with cotton each module 98 is represented by arrows 97 near each cotton module. The location of each cotton module 98 is defined as last end unloaded, center, denoted by a dot 99 on each cotton module.

With reference to FIGS. 12 and 13 for illustration purposes, a simplified record developed for cotton module 106 will include, at least, an identifier assigned to cotton module 106, GPS coordinates for reference location 107, and a heading of the harvesting vehicle denoted by arrow R. Similarly, a simplified record developed for cotton module 108 will include, at least, an identifier assigned to cotton module 108, GPS coordinates for reference location 109, and a heading of the harvesting vehicle represented by an arrow denoted S. The transport vehicle will use the information in the records to identify and locate cotton modules 106 and 108. After transport to a new location, the records developed for cotton modules 106 and 108 will be appended to include the new GPS coordinates for reference location 107 and 109, respectively as well as and a heading of the transport vehicle unloading each module. FIG. 13 includes two possible situations wherein cotton modules 106 and 108 are unloaded end to end, and the record of information developed for each cotton module allows them to be tracked with certainty.

ROW 1 of FIG. 13 corresponds to the situation in which both modules are transported on the same transport vehicle. Cotton module 106 is unloaded first, and the record for cotton module 106 is appended with GPS coordinates for reference location 107 and a heading of the transport vehicle represented by an arrow denoted T. Cotton module 108 is unloaded last, and the record for cotton module 108 is appended with GPS coordinates for reference location 109 and a heading T of the transport vehicle. ROW 1 also corresponds to the situation in which the modules are transported on separate transport vehicles traveling at the same heading during unloading and cotton module 106 is unloaded first.

ROW 2 corresponds to the situation in which cotton modules 106 and 108 are transported on separate vehicles, and the vehicles travel at different headings during unloading. The record for cotton module 106 is appended with GPS coordinates for reference location 107 and a heading of the transport vehicle represented by an arrow denoted U, and the record for cotton module 108 is appended with GPS coordinates for reference location 109 and a heading of the transport vehicle represented by an arrow denoted V. In this situation, the cotton modules may be unloaded in either order.

It can be seen that reference location 107 is not a physically fixed point that must be marked or tagged on cotton module 106 by comparing the relative positions of reference location 107 in ROW 1 and ROW 2 of FIG. 13. The difference between ROW 1 and ROW 2 is the heading of the unloading vehicle for cotton module 106. Defining cotton module locations with respect to the heading of the unloading vehicle provides the flexibility that allows the cotton modules to be tracked with certainty without physical markings.

As discussed above, by accessing the information developed in the record, the user can identify, locate, and track an unmarked cotton module as a function of the information representative of locations of the cotton module and the headings of the vehicles from which the cotton module was unloaded. The present invention is particularly advantageous because it eliminates the labor intensive necessity of marking or tagging each cotton module and eliminates the risk of error associated therewith. In addition, information associated with a crop at various phases of production, such as planting, growing, harvesting, transporting, processing, or classifying can be recorded, correlated, and analyzed for future decision making. Collected data can additionally be used to create a possession and tracking history which may be helpful in determining the effectiveness of equipment, efficiency and timeliness of vehicles, operators, and the like. The possession history may also provide information for determining ownership and/or liability for damage that may occur to the cotton module during transport from field to processing facility.

It will be understood that the foregoing description is for preferred embodiments of this invention and that the invention is not limited to the specific forms shown. Other modifications may be made in the design and arrangement of other elements without departing from the scope of the invention as expressed in the appended claims.

What is claimed is:

1. A system for identifying, locating, and tracking a cotton module of harvested cotton unloaded from a harvesting vehicle and transported by at least one transport vehicle that eliminates a need for physically marking the cotton module, comprising:

location system configured and operable to automatically determine a heading of the harvesting vehicle, a heading of the transport vehicle, wherein the heading indicates a direction of travel at least during unloading, and a location of the cotton module each time the cotton module is unloaded therefrom and loaded onto, respectively; and communication network apparatus including at least one processor programmed to communicate with the harvesting vehicle, the at least one transport vehicle, the location system, and a user through a user interface, and to automatically:

a) assign an identifier to the cotton module when unloaded from the harvesting vehicle, b) develop a record of information related to the cotton module including at least the identifier and the information from the location system, c) augment the record with the information of the heading and location from the location system each time the cotton module is unloaded and loaded, d) store the record in a database, and e) output the record of information;

whereby the cotton module is identified, located, and tracked by the processor as a function of at least one location of the cotton module determined from the location system and the headings of the corresponding vehicle from which the cotton module was unloaded at that at least one location, wherein the location system is configured to determine unloaded locations of the module from a position of the harvester or transport vehicle and the heading of the harvester or transport vehicle that unloaded the module.

2. The system of claim 1, wherein the location system automatically determines the location of the cotton module after unloading from the harvesting vehicle or transport vehicle and prior to loading on the transport vehicle.

3. The system of claim 1, wherein the location of the cotton module comprises a location of a predetermined reference point of the cotton module and the predetermined reference point is a function of the heading of the vehicle from which the cotton module is unloaded.

4. The system of claim 1, wherein the location system includes a global positioning system.

5. The system of claim 1, wherein the record further includes a tracking history of the cotton module developed as a function of successive entries of the information representative of the location of the cotton module and the heading of the vehicle from which the cotton module is unloaded and the location of the cotton module and the heading of the vehicle on which the cotton module is loaded for each time the cotton module is unloaded and loaded, respectively.

6. The system of claim 1, wherein the record further includes information associated with the harvested cotton of the cotton module including at least some of: seed type, timing and quantity of one or more chemicals or fertilizers applied, time of harvest, yield data at time of harvest, moisture content, and harvesting location.

7. The system of claim 1, wherein the record further includes information associated with processing and classifying the cotton module and cotton processed therefrom, including at least some of: identification of a processing facility, yield data at the processing facility, seed cotton weight, lint weight, cotton grade, cotton color, cotton fiber diameter, cotton fiber strength, uniformity, and trash content.

8. The system of claim 1, wherein the location system is configured to determine the heading of the transport vehicle corresponding to loading of the module on the transport vehicle for determining the orientation of the module with respect to the transport vehicle.

9. The system of claim 1, wherein the record further includes a tracking and possession history of the cotton module developed by associating information representative of identification of the vehicle from which the cotton module is unloaded and time of unloading with information from the location system for each time the cotton module is unloaded and information representative of identification of the vehicle on which the cotton module is loaded and time of loading with information from the location system for each time the cotton module is loaded, respectively.

10. The system of claim 1, wherein at least one of the vehicles includes an unloading system that determines the location or progress of cotton module unloading and provides the location of the cotton module to the processor.

11. A method for identifying, locating and tracking a cotton module of harvested cotton unloaded from a harvesting vehicle and transported by at least one transport vehicle that eliminates a need for physically marking the cotton module, comprising the steps of:
  providing a location system associated with a harvesting vehicle and a transport vehicle;
  automatically determining a heading of the harvesting vehicle, a heading of the transport vehicle, and a location of the cotton module each time the cotton module is unloaded therefrom and loaded onto, respectively;
  providing a communication network apparatus including at least one processor;
  communicating with the harvesting vehicle, the at least one transport vehicle, the location system, and a user through a user interface;
  automatically:
    a) assigning an identifier to the cotton module when unloaded from the harvesting vehicle;
    b) developing a record of information related to the cotton module including at least the identifier and information collected related to headings and location of the module from the location system;
    c) augmenting the record with the information from the location system each time the cotton module is unloaded and loaded;
    d) storing the record in a database; and
    e) outputting the information;
  and
    identifying, locating, and tracking the cotton module as a function of the heading of the locations of the cotton module and the headings of the vehicles from which the cotton module was unloaded, wherein the location system is configured to determine unloaded locations of the module from a position of the harvester or transport vehicle and the heading of the harvester or transport vehicle that unloaded the module.

12. The method of claim 11, wherein the location system automatically determines the location of the cotton module after unloading from the harvesting vehicle or transport vehicle and prior to loading on the transport vehicle.

13. The method of claim 11, wherein determining information representative of the location of the cotton module comprises determining information representative of a location of a predetermined reference point on the cotton module, and the predetermined reference point is a function of the heading of the vehicle from which the cotton module is unloaded.

14. The method of claim 11, wherein the location system includes a global positioning system.

15. The method of claim 11, wherein developing the record includes the additional step of developing a tracking history of the cotton module as a function of successive entries of the information representative of the location of the cotton module and the heading of the vehicle which the cotton module is unloaded from or loaded to for each time the cotton module is unloaded and loaded, respectively.

16. The method of claim 11, wherein developing the record of information related to the cotton module further includes providing information associated with the harvested cotton of the cotton module including at least some of: seed type, timing and quantity of one or more chemicals or fertilizers applied, time of harvest, yield data at time of harvest, moisture content, and harvesting location.

17. The method of claim 11, wherein developing the record of information related to the cotton module further includes providing information associated with processing and classifying the cotton module and cotton processed therefrom, including at least some of: identification of a processing facility, yield data at the processing facility, seed cotton weight, lint weight, cotton grade, cotton color, cotton fiber diameter, cotton fiber strength, uniformity, and trash content.

18. The method of claim 11, wherein developing the record of information related to the cotton module further includes recording information representative of identification of the harvesting vehicle, identification of the transport vehicle, time of loading the cotton module, and time of unloading the cotton module for each time the cotton module is loaded and unloaded.

19. The method of claim 11, wherein developing the record includes the additional step of developing a tracking and possession history of the cotton module by associating information representative of identification of the vehicle from which the cotton module is unloaded and time of unloading with information from the location system for each time the cotton module is unloaded and information representative of identification of the vehicle on which the cotton module is loaded and time of loading with information from the location system for each time the cotton module is loaded, respectively.

20. The system of claim 10, wherein the location system stores the location of the cotton module when unloaded and uses the location in guiding a transport vehicle designated to load the module.

\* \* \* \* \*